United States Patent Office 3,489,663
Patented Jan. 13, 1970

3,489,663
ELECTROLYTIC POLYMERIZATION
John W. Bayer, Perrysburg, and Edgardo Santiago, Toledo, Ohio, assignors to Owens-Illinois, Inc., a corporation of Ohio
No Drawing. Filed Oct. 19, 1965, Ser. No. 498,088
Int. Cl. C08f 1/11; B01k 1/00
U.S. Cl. 204—59
17 Claims

ABSTRACT OF THE DISCLOSURE

Electrolytic polymerization of ethylenically unsaturated monomers by a method comprising applying an electric potential while the monomer is in a liquid diluent containing a polymeric ternary or a quarternary onium compound as a conducting electrolyte; new polymeric quarternary amonium compounds; and method for preparing such quarternary amonium compounds.

---

This invention relates broadly to the art of polymerization. More particularly it is concerned with a method for the electrolytic polymerization of polymerizable, ethylenically unsaturated monomer(s) wherein is utilized an electrolyte that provides unobvious results. The scope of the invention also includes certain new electrolytes used in practicing the invention.

Electroinitiated polymerization techniques are provided by passing a current of electricity through a solution of a monomer to form ions which then form the propagating species. An electronic representation of this initiation step follows:

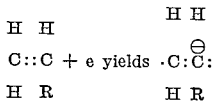

which latter contains a radical on one side and an anion on the other. Two of the radical ions join to give the double ion

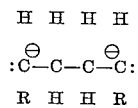

which then becomes the initiating species similar to that which prevails in the simple anionic polymerization techniques. The most influencing factor in electroinitiated polymerization techniques is the electrolyte employed to render the monomer or solvent-monomer mixture electrically conducting.

It was suggested prior to the present invention (see Forster U.S. Patent No. 3,140,276) that a limited class of ethylenically unsaturated monomers be continuously electrolytically polymerized in a non-aqueous, substituted-hydrocarbon liquid dispersion of the monomer, in the presence of a minor amount of a quarternary ammonium halide, and recovering the polymer of the said monomer from the area of the cathodic electrode. The monomers in the process of Forster are those embraced by the formula I

wherein Y is hydrogen or a lower alkyl radical, and Z is hydrogen or a halogen atom, or an alkyl or a cyano (—CN) radical. The electrolytes employed by Forster are monomeric compounds, and are those quarternary ammonium compounds represented by the formula $R_4NX$ where R is an alkyl group having 1 through 6 carbon atoms, and X is chlorine, bromine or iodine.

The present invention is based on our discovery that the use of polyquarternary (i.e., polymeric quarternary) onium compounds, more particularly polyquarternary ammonium compounds, specifically salts, in electroinitiated polymerizations having unobvious advantages as compared with the monomeric quarternary salts such as tetraethyl ammonium bromide. These advantages include:

(1) The yields are higher.
(2) The current is more stable over long periods of time.
(3) The solutions of the polymer are usually lighter colored immediately after the electroinitiated polymerization.

The present invention is especially useful in the electrolytic polymerization of at least one polymerizable ethylenically unsaturated monomer, more particularly such a monomer or monomers containing at least one terminal $CH_2=C<$ grouping, e.g., a single or a plurality (two, three, four or more) $CH_2C<$ groupings. In polymerizing such monomers in accordance with this invention the electrical potential may be applied to two electrodes immersed in a dispersion (including solution) of said monomer in a suitable liquid diluent. When the polymerizable monomer is one which is insoluble in water (as are most monomers), then the diluent is preferably a non-aqueous liquid diluent; or the diluent may be an excess of the monomer to be polymerized. Water is a suitable liquid diluent and can be used efficiently when water-soluble monomers (e.g., acrylic acid, methacrylic acid, acrylonitrile, acrylamide and other water-soluble ethylenically unsaturated monomers known in the art) are to be subjected to polymerization in accordance with this invention.

The polymer of the unsaturated monomer is then recovered (i.e., isolated) from the reaction mass by any suitable means, e.g., by centrifuging, filtration and similar means if the polymer is one that is insoluble in the particular non-aqueous liquid diluent employed; or by precipitation from a non-solvent if the polymer is one that is soluble in the diluent, followed by filtration; or by a combination of such means as may be required. Washing (if desired or required) and drying conclude the isolation steps.

The electrolytic apparatus may be any conventional electrolytic cell. For instance, one may use a so-called "H" type of cell. Either A.C. or D.C. current may be employed. The electric force that is applied may be varied over a wide range depending, for instance, upon the particular monomer or monomeric mixture that is to be polymerized, the particular diluent and polymeric electrolyte (e.g., polyternary or polyquarternary electrolyte) used, and other influencing factors. Thus, the applied voltage may range, for example, from less than 1 volt to 1000 volts or more, but is usually within the range of from about 1 to 100 volts. In practing our invention we prefer to use a constant voltage and to allow the current to fall wherever determined by the specific reaction mixture employed.

The electrodes may be in a variety of different shapes. They may be made of carbon or any of a large number of different metals, e.g., lead, platinum, gold, titanium, tungsten, aluminum, nickel, iron or steel, mercury, etc. Instead of applying the electric potential to two electrodes immersed in the dispersion or solution of the monomer in a diluent as previously has been mentioned the cathode may be placed in a separate compartment containing a separate pool of electrolyte.

Any suitable non-aqueous liquid diluent may be employed but it is preferred to use one having a dielectric constant between 10 and about 110, and more preferably from about 25 to about 110. Although it is not essential that the selected diluent be one in which the polymer is soluble, it is usually preferable to employ a diluent that is capable of dissolving the polymeric product of the polymerization reaction. Illustrative examples of non-aqueous liquids that may be used in practicing the present invention include, for instance, formamide (dielectric constant of 109), dimethylformamide, N,N-dimethylacetamide, dimethylsulfoxide, acetonitrile, nitrobenzene, pyridine (dielectric constant of about 12), hexamethylphosphoramide, tetramethylenesulfone, N-methylpyrrolidone and other high dipole organic liquids.

As previously has been indicated, it is not essential that the liquid diluent be a separately added non-aqueous liquid that is different from the ethylenically unsaturated monomer that is being polymerized, since an excess of the monomer itself may constitute the diluent for the monomer which is undergoing polymerization. For example, an excess of acrylonitrile may constitute the diluent when acrylonitrile is being polymerized in accordance with this invention, as may also other polymerizable monomers which are normally liquid at the reaction temperature and of which numerous illustrative examples hereafter are given.

THE POLYMERIZABLE MONOMER

Illustrative examples of other monomers that may be used in practicing the present invention, singly or a plurality thereof (e.g., two, three, four or any higher desired number), or admixed with other copolymerizable monomers not specifically mentioned herein, are the vinyl cyclic compounds (including monovinyl aromatic hydrocarbons), e.g., styrene, o-, m- and p-chlorostyrenes, -bromostyrenes, -fluorostyrenes, -methylstyrenes, -ethylstyrenes, -cyanostyrenes, etc., vinylnaphthalene, vinylcyclohexane, vinylfurane, the various unsubstituted and substituted vinylpyridines, vinyldibenzifurane, divinylbenzene, trivinylbenzene, allylbenzene, diallylbenzene, N-vinylcarbazole, the various allyl cyanostyrenes, the various alpha-substituted styrenes and alpha-substituted ring-substituted styrenes, e.g., alpha-methylstyrene, alpha-methyl-para-methylstyrene, etc.; vinyl aliphatic compounds other than the aforementioned acrylonitrile, e.g., the various substituted acrylonitriles and other compounds containing a

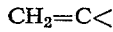

grouping, including methacrylonitrile, ethacrylonitrile, phenylacrylonitrile, acrylamide and the various substituted acrylamides (e.g., methacrylamide, ethacrylamide, the various N-substituted acrylamides and alkacrylamides, for instance N-methylolacrylamide, N-monoalkyl- and -dialkylacrylamides and -methacrylamides, e.g., N-monomethyl-, -ethyl-, -propyl-, -butyl-, etc., and N-dimethyl-, -ethyl-, -propyl-, -butyl-, etc., acrylamides and methacrylamides, N-monoaryl- and -diarylacrylamides and -alkacrylamides such as the N-monophenyl and -diphenyl-acrylamides and methacrylamides, etc.); the vinyl esters, e.g., vinyl esters of alkanoic and alkenylic acids including vinyl acetate, vinyl propionate, vinyl butyrate, vinyl isobutyrate, vinyl valerate, vinyl acrylate, vinyl methacrylate, etc.; the various acrylic compounds, among which may be mentioned esters of an acrylic acid (including acrylic acid itself and the various alpha-substituted acrylic acids, e.g., methacrylic, ethacrylic and phenylacrylic acids), more particularly the alkyl esters of an acrylic acid (including alkacrylic and arylacrylic acids), e.g., the methyl, ethyl and the normal and isomeric forms of propyl, butyl and amyl through dodecyl esters of acrylic, methacrylic, ethacrylic and phenylacrylic acids.

Other examples of allyl compounds that may be employed, in addition to those mentioned in the preceding paragraph, are allyl acetate, allyl lactate, allyl acrylate, allyl methacrylate, allyl alpha-hydroxyisobutyrate, allyl-trichlorosilane, diallyl carbonate, diallyl oxalate, diallyl malonate, diallyl succinate, diallyl gluconate, diallyl methylgluconate, diallyl adipate, diallyl azelate, diallyl sebacate, diallyl tartronate, diallyl tartrate, diallyl maleate, diallyl fumarate, diallyl mesaconate, diallyl citraconate, diallyl muconate, diallyl itaconate, diallyl phthalate, diallyl chlorophthalate, diallyl dichlorosilane, the diallyl ester of endomethylene tetrahydrophthalic acid, triallyl tricarballylate, triallyl aconitate, triallyl cyanurate, triallyl isocyanurate, triallyl citrate, triallyl phosphate, trimethallyl phosphate, tetrallyl silicate and hexallyldisiloxane. Other examples of allyl compounds that may be used are given in, for instance, U.S. Patent No. 2,510,503.

Still other and/or more specific examples of monomers containing a $CH_2=C<$ grouping that may be used in practicing this invention are the unsaturated ethers, e.g., ethyl vinyl ether, diallyl ether, ethyl allyl ether, the unsaturated alcohol esters (in addition to the previously mentioned vinyl, allyl and methallyl esters), more particularly the crotyl, 1-chloroallyl, 2-chloroallyl, cinnamyl, methvinyl, 1-phenylallyl, butenyl, etc., esters of saturated and unsaturated, aliphatic and aromatic, monobasic and polybasic acids such as, for instance, acetic, phenylacetic, crotonic, acrylic, methacrylic, succinic, pimelic, fumaric, maleic, benzoic, acetylene dicarboxylic, terephthalic, benzoylphthalic and of the other acids hereinbefore mentioned; the saturated monohydric alcohol esters, e.g., methyl, ethyl and propyl through dodecyl (both normal and isomeric forms) esters of saturated aliphatic and monobasic and polybasic acids, numerous illustrative examples of which previously have been given; also isoprene, chloroprene, 2,3-dimethylbutadiene and the like; vinyl halides (chloride, fluoride, bromide and iodide), and the various vinylidene compounds including the various vinylidene halides (chloride, bromide, fluoride and iodide); methylene malonic esters, e.g., methylene methyl malonate, methylene ethyl malonate, etc.; unsaturated polyhydric alcohol (e.g., 3-butene-1,2-diol, etc.) esters of saturated and unsaturated, aliphatic and aromatic, monobasic and polybasic acids; and other compounds containing either a single $CH_2=C<$ or a plurality of $CH_2=C<$ groupings, examples of which will be apparent to those skilled in the art from the foregoing illustrative examples.

In some cases it may be necessary to carry out the electro-initiated polymerization process of this invention under superatmospheric pressure, e.g., when the monomer to be polymerized is normally a gas such as, for example, the various normally gaseous unsubstituted and substituted hydrocarbons, e.g., ethylene, propylene, the various gaseous butenes, vinyl chloride, vinyl fluoride and the like. The superatmospheric pressure employed can be any pressure that is required to maintain the normally gaseous monomer or mixture of monomers in the liquid state at the operating temperature.

Of the monomeric materials that can be polymerized in accordance with this invention we prefer to use those having a boiling point of at least about 40° C., and more preferably at least about 50° C. or higher, e.g., 100°–150° C. or higher. It is also desirable for them to be either in liquid state at ambient temperature (or at least at the reaction temperature); or, if not normally a liquid at such temperatures, that they be in solution (including dispersion) state, e.g., dissolved or dispersed in water or in the aforementioned non-aqueous diluent. If this diluent is other than an excess of the particular monomer or mixture of monomers undergoing polymerization, it is preferably one that is inert (substantially completely inert) during the course of the polymerization reaction.

THE POLYMERIC ELECTROLYTE

The polymeric electrolytes useful in practicing this invention include, for example, both polyternary and polyquaternary onium compounds. Unlike the monomeric quaternary electrolytes suggested by Forster in his aforementioned patent, they are polymers wherein the quaternary nitrogen atoms or their obvious equivalent (e.g., sulfur or phosphorus atoms) are contained in the backbone of the polymer. In this respect they differ from the monomeric quaternary electrolytes mentioned by Forster;

and, also, from quaternary polymers obtained by polymerizing unsaturated salts, e.g., allyltrimethylammonium bromide, and wherein the nitrogen present in the polymer forms a part of pendant side groups.

Illustrative examples of polymeric electrolytes that can be employed in carrying this invention into effect are linear polymeric quaternary ammonium compounds, more particularly salts, having recurring units of the formula II 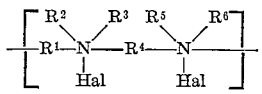

wherein Hal is chlorine, bromine or iodine; $R^1$, the dihalide residue, is a radical in which the atoms adjacent to nitrogen are attached to other atoms only by single bonds; $R^2$, $R^3$ and $R^4$ are radicals so selected that no more than one of them is unsaturated; $R^5$ and $R^6$ are saturated except that one may be unsaturated when $R^4$ is saturated; and $R^1$ and $R^4$ are the same or different radicals, the sum of the chain length of which exceeds 2 if both are methylene ($-CH_2-$). $R^4$ represents the bridging or joining divalent radical of a ditertiary diamine which is reacted with a dihalide to form the polymeric quaternary ammonium salt, and $R^1$ is the bridging or joining radical of the aforementioned dihalide. Specific examples of such polymeric quaternary ammonium salts are those obtained by a condensation reaction between a ditertiary amine, e.g., N,N,N',N'-tetraalkyl-p,p'-diaminodiphenylmethane and p-xylylene dichloride, dibromide or diiodide. Such polymeric quaternary ammonium salts and their preparation are more fully described in Ritter U.S. Patent No. 2,261,002, and which by this cross-reference is made a part of the disclosure of the instant application.

Other examples of polymeric electrolytes, more particularly linear polymeric onium salts that are useful in this invention, are those described in Searle U.S. Patent No. 2,271,378, and which by this cross-reference is also made a part of the disclosure of the present application. The recurring linear polymeric unit in the onium salts used by Searle for pest control comprises at least seven chain atoms, two of which are onium atoms, specifically sulfur, nitrogen and/or phosphorus atoms, separated by organic radicals attached to the onium atoms through carbon, one of the valences on each onium atom being satisfied by a radical which is the anion of an acid. The remaining valences of the onium atom are satisfied by organic radicals attached to the onium atom through the carbon; and not more than one of the carbon atoms attached to the onium atom is in turn joined to another carbon by a multiple bond.

The majority of the polymeric salts of Searle may be represented as having the following structure III 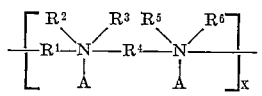

wherein $x$ is an integer representing the number of multiple recurring units in the polymeric chain, A is the anion of an acid, and $R^1$, $R^2$, $R^3$, $R^4$, $R^5$ and $R^6$ are all organic radicals joined to the nitrogen by carbon. Preferably, the several R's are so selected in relation to each other that $R^1$ contains a single-bonded carbon adjacent to the nitrogen and, of the remaining radicals, no two attached to one nitrogen atom contain a multiple-bonded carbon adjacent to the nitrogen. $R^2$ and $R^3$ can be externally joined to form a ring, as can $R^5$ and $R^6$. Species of the linear polymeric onium salts employed by Searle as a pest control are embraced by Formula II, that is, those described in the aforementioned Ritter U.S. Patent No. 2,261,002.

Additional examples of linear polymeric onium compounds useful as the electrolyte in practicing this invention are quaternary polyalkylene polyamines represented by the general formula IV 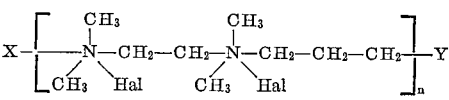

wherein X is selected from the class consisting of $ClCH_2CH_2CH_2-$ and the grouping

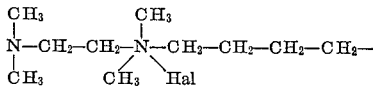

and Y is selected from the class consisting of Cl and the grouping

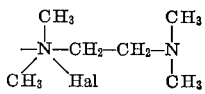

wherein Hal represents a halogen atom and $n$ represents a number between 4 and 29, inclusive. Illustrative examples of such quaternary polyalkylene polyamines are those obtained by contacting 1,2-bis(dimethylamino)ethane with 1,4-dichlorobutane or 1,4-dibromobutane. Such polyquaternary ammonium compounds and their use in improving the wet fastness of a cellulosic fiber with a substantive dyestuff are more fully described in Taube et al. U.S. Patent No. 3,009,761.

One preferred class of linear polymeric quaternary onium, more particularly ammonium, compounds useful as an electrolyte in practicing this invention are those which consist essentially of the recurring unit represented by the general formula V 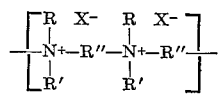

wherein R and R' each represent an alkyl (including cycloalkyl), aralkyl, aryl or alkaryl radical, each R'' represents an alkylene (including cycloalkylene) radical, and $X^-$ represents an anion. The radicals represented by R and R' may be the same or different, as may also each R''.

Illustrative examples of radicals represented by R and R' in Formula V are methyl, ethyl, and propyl through octadecyl (both normal and isomeric forms), cyclopentyl, cyclohexyl, cycloheptyl, benzyl, phenylethyl, phenylpropyl, phenylisopropyl, phenyl, biphenylyl or xenyl, naphthyl, tolyl, xylyl, ethylphenyl, propylphenyl, isopropylphenyl and butylphenyl. Illustrative examples of anions represented by $X^-$ are the halide ions (chloride, bromide, fluoride and iodide ions), sulfate, methylsulfate, ethylsulfate, sulfonate, phosphate (more particularly dihydrogen phosphate), hydroxide, borate, cyanide, carbonate, hydrocarbonate, thiocyanate, sulfite, bisulfite, nitrate, nitrite, oxalate, silicate, sulfide, cyanate, alkanoates, such as the acetate, propionate, butyrate, valerate, etc., and the halogenated alkanoates, such as the chlorinated acetates and the higher members of the homologous series, and the other common organic and inorganic anions. To the best of our knowledge and belief $X^-$ can be any anion. Preferably each of the radicals represented by R and R' contain not more than 10 carbon atoms, and still more preferably not more than about 7 carbon atoms.

Illustrative examples of alkylene radicals represented by R'' in Formula V are methylene, ethylene and propylene (trimethylene) through dodecamethylene (both normal and isomeric forms), cyclopentylene, cyclohexylene and cycloheptylene. Preferably the alkylene radicals represented by R'' do not contain more than about 8 carbon atoms, and still more preferably not more than about 6 carbon atoms, e.g., from 1 to 4 or 5 carbon atoms.

The linear polymeric quaternary ammonium compounds consisting essentially of the recurring unit represented by Formula V can be prepared by, for example, effecting reaction between a secondary amine and, for instance, a dihaloalkane. The reaction may be illustrated by the following equation:

VI

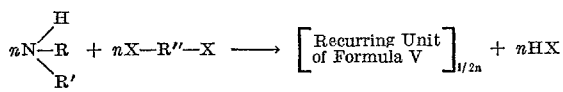

In this equation R, R', R" and X (or X⁻) have the same meanings as given above with reference to Formula V, and n corresponds to the number of moles of each reactant. Illustrative examples of the secondary amine reactants are dimethylamine, diethylamine and higher members of the homologous series, dibenzylamine, diphenylamine and ditolylamine. Illustrative examples of dihaloalkane reactants are methylene chloride, ethylene bromide, 1,3-dibromopropane, the various dichloro-, dibromo- and di-iodobutanes including 1,4-dichlorobutane, 1,4-dibromobutane and 1,4-di-iodobutane, the various difluoropentanes including 1,5-difluoropentane, and others that will be apparent to those skilled in the art from the foregoing illustrative examples. These polymers are water-soluble, ionic-type polymers.

Polymers wherein the alkylene radicals (R" in Formula V) are different from each other can be made by using a mixture of haloalkanes, e.g., a mixture of ethylene bromide and dibromopentane, of dibromobutane and dibromopentane, etc. Polymers containing different anions (X⁻ in Formula V) can be obtained by similarly using haloalkanes wherein the halogens are different.

Another preferred class of polymeric quaternary onium, more particularly ammonium, compounds useful as an electrolyte in carrying this invention into effect are those which consist essentially of the recurring unit represented by the general formula

VII

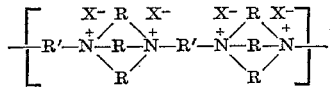

wherein R represents an alkylene or aralkylene radical, R' represents an alkylene (including cycloalkylene) radical, and X⁻ represents an anion. The various R's bonded to N may be the same or different, as may also the alkylene radicals represented by each R'.

Illustrative of alkylene radicals represented by R' in Formula VII and of anions represented by X⁻ are the same as the examples of alkylene radicals R radicals and of X⁻ anions set forth hereinbefore with reference to Formula V.

The linear polymeric quaternary ammonium compounds consisting essentially of the recurring unit represented by Formula VII can be prepared by effecting reaction between polyfunctional tertiary amines and, for example, polyfunctional halo compounds. The reaction may be illustrated by the following equation:

VIII

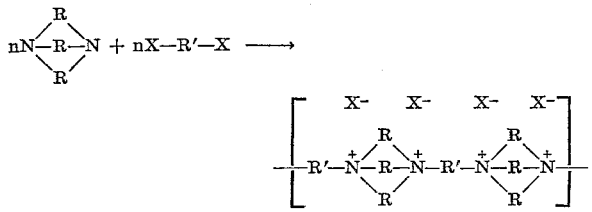

In this equation R, R' and X (or X⁻) have the same meanings as given above with reference to Formula VII, and n corresponds to the number of moles of each reactant.

Illustrative examples of polyfunctional tertiary amines that may be used in carrying out the reaction represented by Equation VIII are ditertiary amines, e.g., triethylenediamine, tri-n-propylenediamine, triisopropylenediamine, and the various tributylenediamines, triamylenediamines and trihexylenediamines including the normal and isomeric forms of the alkylene radicals present in these diamines; tritertiary-amines, e.g., compounds represented by the general formula

IX

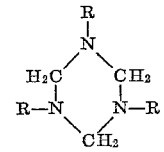

wherein R represents a monovalent hydrocarbon radical, more particularly an alkyl (including cycloalkyl), aralkyl, aryl or alkaryl radical, numerous examples of which radicals have been given hereinbefore with reference to R and R' in Formula V. The various R's in the hexahydro-s-triazines embraced by Formula IX may be the same or different, e.g., the same or different methyl or phenyl radicals. Specific examples of tritertiary amines within the scope of Formula IX are 1,3,5-trimethylhexahydro-s-triazine and 1,3,5-triphenylhexahydro-s-triazine.

Other examples of polyfunctional tertiary-amines that may be employed in carrying out the reaction represented by Equation VIII are the tetratertiary-amines, e.g., hexamethylenetetramine (also known as hexamine), and which has the following structure:

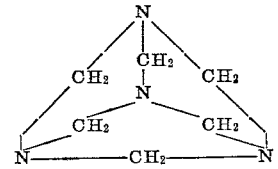

Hexamethylenetetramine and equivalent tetramines form cross-linked resinous quaternary ammonium compounds when reacted with, for example, a polyfunctional halo compound in a manner analgous to that illustrated by Equation VIII.

Illustrative examples of polyfunctional halo compounds that can be used as a reactant with the polyfunctional tertiary amine are the same as those previously mentioned with reference to Equation VI.

Instead of forming a polyquaternary onium compound containing a halide anion as above described, quaternizing agents other than a polyfunctional halo compound, e.g., a haloalkane, may be employed. For instance, salts such as the sulfates and sulfonates of the polymer can be prepared by substituting for the haloalkane reactant an equivalent amount of a dialkyl sulfate, e.g., dimethyl sulfate, diethyl sulfate, di-n-propyl sulfate, di-isopropyl sulfate, di-n-butyl, etc.; an arylenedisulfonic acid, e.g., benzenedisulfonic acids, toluenedisulfonic acids, etc.; or other known quaternizing agents. Polymeric electrolytes wherein the anion is OH⁻ can be produced by first forming the halogen-containing polymers and then reacting such a polymer with AgOH to yield the corresponding silver halide, e.g., AgCl or AgBr, and a polymer containing OH⁻ anions.

Also, instead of employing a secondary- or a tertiary-amine as hereinbefore described in preparing the polyquaternary ammonium compounds, other polyternary and polyquaternary onium compounds may be produced, for example, by using the sulfur and phosphorus analogues corresponding to the described secondary- and tertiary-amine reactants (or other methods of preparation may be employed) to obtain polyquaternary sulfonium and phosphonium compounds for use, for example, as electrolytes in practicing the present invention.

In producing the polymeric quaternary ammonium compounds represented by both Formulas V and VII, equal or equivalent (substantially equal or equivalent) molar proportions of reactants are employed, and it is preferred that either reactant be not more than about 10 mole percent in excess of the other. Substantially equivalent molar proportions are employed when the functionality of the reactants differ from each other. For example, the reactants are used in a molar ratio of about 1.5 moles of a difunctional quaternizing agent, specifically a dihaloalkane, per mole of the amine when the latter is a tritertiary-amine, and in a molar ratio of about 2.0 moles of a difunctional quaternizing agent, more particularly a dihaloalkane, per mole of amine when a tetratertiary-amine such as hexamethylenetetramine is employed.

The reactions that occur in the production of the polymers exemplified by Formulas V and VII, and more specifically between a secondary-amine (or a tertiary-amine) and a dihaloalkane or other polyfunctional quaternizing agent are effected at a temperature ranging from 0° C. or a lower in the case of the normally gaseous or low-boiling reactants up to the boiling temperature of the reaction mass but below the temperature of decomposition of the reactants and of the polymeric reaction product. In general, the temperature at which the reaction is effected is governed by the boiling point of the reactants. For instance, in the case of reactants that are normally liquids at ambient temperature and atmospheric pressure, the reaction may be carried out within the range of from ambient to the reflux temperature of the reaction mass.

The reaction may be effected at atmospheric, subatmospheric or super-atmospheric pressure, and in the presence or absence (but preferably in the presence) of an essentially non-aqueous, more particularly anhydrous (substantially completely anhydrous), liquid medium which is inert during the reaction; that is, one which is inert (non-reactive) toward the reactants and the polymeric reaction product during the course of the reaction. By "substantially completely anhydrous" liquid medium is meant one which contains no more than a trace of water or the amount of water that might be present in the commercial product. Illustrative examples of such liquid media (solvents or diluents) are any of the saturated alkanes that either are normally liquids or are liquids at the particular reaction temperature and pressure employed (e.g., n-hexane and other isomers of hexane or mixtures thereof, the various heptanes, octanes, nonanes, decanes, etc.); aromatic hydrocarbons, e.g., benzene, toluene, xylene, etc.; chlorinated aromatic compounds, e.g., chlorobenzene, etc.; straight-chain and cyclic ethers, e.g., dialkyl ethers including di-n-propyl ether, di-n-butyl ether and higher members of the homologous series, dioxane; and others that will be apparent to those skilled in the art from the foregoing illustrative examples.

The reaction period may range from a contact period of a minute or less in some cases to 2 or 3 days or more in other cases, depending upon the particular reactants employed, the particular temperature and other conditions of reaction, and other influencing factors. Under refluxing or near-refluxing conditions, the reaction is generally complete within a period of from 1 minute or less (e.g., 1 to 5 seconds, i.e., almost instantaneously) to 24 hours. For example, in a reaction between (a) a xylene solution of hexamethylenetetramine and (b) 1,5-dibromopentane added dropwise to the aforesaid solution, the reaction mass gelled upon completion of the addition of the dibromopentane and the simultaneous beginning or refluxing. In other cases, using other reactants, refluxing periods of 18 hours and more have been necessary in order to obtain a maximum yield of the desired polymer.

Any suitable means can be employed to isolate the polymeric onium, specifically ammonium, compound from the reaction mass. Usually it is isolated by filtration, washed with an inert wash fluid, e.g., benzene or other liquid such as those previously mentioned as being suitable for use as liquid reaction media, and dried in air or in a heated oven. Vacuum-drying at ambient temperature or under heat is preferred.

ADDITIONAL DETAILS ON ELECTROINITIATED POLYMERIZATIONS USING A POLYMERIC ONIUM ELECTROLYTE

In carrying out the electroinitiated polymerizations in accordance with this invention any suitable amount of monomer may be employed with respect to the liquid diluent, but generally the monomer constitutes from about 5% to about 75%, preferably from about 5 or 10% to about 40 or 50%, by weight of the total amount of the said liquid diluent, e.g., dimethylformamide, and monomer.

The amount of polymeric onium compound, e.g., sulfonium (which forms a polyternary onium compound), phosphonium or preferably ammonium compound, that is present in the dispersion or solution of the monomer in the liquid diluent ranges from (i.e., corresponds to) 0.005 mer mole, preferably 0.01 mer mole, to saturation. Good results have been obtained when the quaternary onium, specifically ammonium, compound constituted about 0.25 mer mole on the same basis just described.

The temperature at which the polymerization is effected may be widely varied, e.g., from 0° C. to 80° or 90° or even 100° C. or higher, but usually it is desirable to carry out the polymerization reaction at as low a temperature as possible consistent with the obtainment of an optimum yield of commercially acceptable polymer of the desired average molecular weight, e.g., from about 0° C. to about 60° C. Thus, the polymerization temperature advantageously is maintained below about 50° C., and preferably not higher than about 40° or 45° C., e.g. from 0° C. to 30° or 35° C. Ambient-temperature (20°–30° C.) polymerizations are commonly employed to obtain polymeric products of the best possible color without the expense of refrigeration for carrying out the reaction at lower temperatures.

The period of the polymerization reaction cannot be stated with certainty since it depends upon so many different influencing factors including the size of the equipment employed. We have used polymerization times ranging from 2 hours to 48 hours, but in some cases it might be as low as 15 minutes while in others the polymerization might be continued for 3 days or longer.

As the polymerization reaction proceeds, the reaction mixture usually assumes a light yellow color and gradually increases in viscosity, especially where high monomer concentrations are involved.

When the diluent is water, or dimethylformamide or equivalent non-aqueous liquid, then at the end of the electrolysis period the polymer of the ethylenically unsaturated monomer that has been polymerized is collected by any suitable means. For instance, when the polymer is soluble in the diluent, e.g., dimethylformamide, the polymer can be isolated by pouring the reaction mixture into a large volume of a non-solvent for the polymer, e.g., methanol, separating the polymer by filtration, and drying the isolated polymer, for example by heating it under vacuum for at least 24 hours. When the polymer is insoluble in the diluent, it can be recovered by centrifuging, filtration or the like, followed by washing and drying.

Polystyrene and poly(methyl methacrylate) are completely soluble in dimethylformamide (DMF), and when produced by our method using DMF as a diluent, they can be recovered as white polymers by precipitation from methanol, filtration and drying. When similarly polymerized and isolated, the recovered polyacrylonitrile is light yellow in color, being much better from a color standpoint than electroinitiated polyacrylonitrile wherein a monomeric quaternary ammonium salt is used as an electrolyte.

In order that those skilled in the art may better understand how the present invention can be carried into effect, the following examples are given by way of illustration and not by way of limitation. All parts and percentages are by weight unless otherwise stated.

The following is a brief description of the electrolytic cell employed in the examples:

The electrolytic cell consists of a 500-ml. resin kettle modified by fusing two glass rods to the cover of the kettle. The glass rods contain a platinum wire, one end of which is exposed externally and the other of which is connected with a platinum foil $3/1000$-inch thick and one inch on a side. The electrodes are adjusted so that they are $\frac{1}{2}$-inch apart and $1\frac{1}{2}$ inches from the bottom of the reaction vessel. The kettle is equipped with a stirrer and a thermometer. DC current is supplied by a power-supply unit (Model TW–4005 of Power Designs, Inc.) that is capable of supplying a constant current and a constant voltage.

Example 1

This example illustrates the results obtained when typical ethylenically unsaturated monomers, specifically styrene and methyl methacrylate (MMA), are subjected to an electrolytic action using typical quaternary onium monomers, more particularly allyltriethylammonium bromide (allyl $Et_3$ NBr), tetraethylammonium bromide (ethyl$_4$ NBr) and tetrallylammonium bromide (allyl$_4$ NBr), under different voltages, milliamperes of electric current and electrolysis time periods. The runs were made at 30°–35° C. The formulations for I–A through I–F were as follows:

Dimethylformamide, g. _____ 260
Monomer, g. _____ 140
Electrolyte, mer mole [1] _____ 0.01

The formulations for I–G through I–L were as follows:

Dimethylformamide, ml. _____ 250
Monomer, g. _____ 150
Electrolyte, mer mole [1] _____ 0.1

[1] The 0.01 or 0.1 mer mole refers to the mer weight of the onium compound, the mer weight being that of the unit when $n=1$ as in Formulas V and VII.

The reaction mixtures were poured into methanol, any polystyrene or poly(methyl methacrylate) was filtered off, and the isolated polymer was dried under vacuum at ambient temperature for 24 hours. The results are summarized in Table I.

TABLE I

| Example No. | Monomer | Electrolyte | EMF, v.[1] | Current, ma.[1] | Time, hrs. | Yield, g. |
|---|---|---|---|---|---|---|
| I–A | Styrene | Allyl Et$_3$ NBr | 20 | 100→52 | 4 | 1.5 |
| I–B | do | do | 20 | 100→40 | 18 | 0 |
| I–C | do | do | 20 | 110→15 | 18 | 0 |
| I–D | MMA | Allyl$_4$ NBr | 20 | 85→15 | 18 | 0 |
| I–E | Styrene | do | 20 | 85→15 | 18 | 0 |
| I–F | do | Allyl Et$_3$ NBr | 8→40 | [2] 30 | 24 | 0 |
| I–G | do | Ethyl$_4$ NBr | 40 | 20 | 24 | 7 |
| I–H | MMA | do | 40 | 10 | 2 | 0 |
| I–I | MMA | do | 40 | 15 | 2 | 0 |
| I–J | MMA | do | 10 | 30 | 18 | Trace |
| I–K | MMA | do | 10 | 30 | 2 | 0 |
| I–L | MMA | do | 40 | 100 | 22 | Trace |

[1] The arrow (→) means that the EMF or the current changed throughout the reaction.
[2] The current (ma.) was constant in the runs of Example Nos. I–F through I–L.

Example 2

This example illustrates the results obtained when the same typical monomers employed in Example 1, i.e., styrene and methyl methacrylate, are subjected to an electrolytic action using typical polymeric onium compounds of the kind employed in practicing this invention, and more particularly polymeric quaternary ammonium salts consisting essentially of the recurring unit given in each of Formulas V and VII, and the cross-linked polyquaternary ammonium salt obtained by the reaction between hexamethylenetetramine and 1,5-dibromopentane in the ratio of one mole of the former to two moles of the latter.

The same apparatus was used as in Example 1. The procedure, except for the differences indicated in Table II wherein the results are summarized, likewise was essentially the same as given in Example 1. The proportions of dimethylformamide, monomer and electrolyte were the same as those employed in I–G through I–L. The polymeric quaternary ammonium electrolytes used in the different runs are described immediately after Table II.

From a comparison of the results shown in Tables I

TABLE II

| Example No. | Monomer | Electrolyte | EMF, v. | Current, ma. | Time, hrs. | Yield, g. |
|---|---|---|---|---|---|---|
| 2–A | MMA | Poly–1 | 40 | 45 | 20 | 54 |
| 2–B | MMA | Poly–2 | 40 | 40 | 20 | 53 |
| 2–C | MMA | Poly–3 | 40 | 38 | 24 | 46 |
| 2–D | MMA | Poly–4 | 40 | 30 | 24 | 37 |
| 2–E | MMA | Poly–5 | 40 | 40 | 24 | 82.5 |
| 2–F | MMA | Poly–6 | 40 | 44 | 24 | 68 |
| 2–G | MMA | Poly–7 | 40 | 80 | 24 | 38 |
| 2–H | MMA | Poly–8 | 40 | 80 | 24 | 103 |
| 2–I | Styrene | Poly–6 | 40 | 80 | 24 | 47 |
| 2–J | MMA | Poly–8 | 40 | 60 | 6 | 28 |
| 2–L | Styrene | Poly–2 | 40 | 50 | 24 | 15.0 |
| 2–M | do | Poly–5 | 40 | 50 | 24 | 36.5 | and II it will be noted that the use of a polymeric onium salt as an electrolyte provides a more stable current over a much longer period of time than is possible by the use of a monomeric onium salt. Furthermore, the yields of polymer resulting from the process of this invention are not only materially higher than when using an onium monomer, e.g., from about 2-fold to over 30-fold in the polymerization of styrene, but in the majority of runs with both styrene and methyl methacrylate the use of the onium monomer yielded either no polymer or only traces whereas the polymeric onium electrolyte gave substantial and infinitely larger polymer yields. Further, such polymers as were obtained in the runs of Table I using monomeric quaternary ammonium salts were dark-colored, whereas those resulting from the runs of Table II in which polymeric quaternary ammonium salts were employed were much lighter.

PREPARATION OF THE POLYQUATERNARY AMMONIUM SALTS USED IN EXAMPLE 2

The polyquarternary ammonium salts employed in Example 2, and which are identified in Table II as Poly–1 through Poly–8, are prepared, for example, as follows:

Poly–1

This polyquarternary ammonium salt is a reaction product of triethylenediamine and ethylene bromide.

To 100 ml. of xylene is added 18.8 g. (0.1 m.) of ethylene bromide and 11.2 g. (0.1 m.) of triethylenediamine.

This is stirred at room temperature for ½ hour at which time a gelatinous precipitate forms. This is isolated by filtration, washed with benzene and dried at 60° C. under vacuum. A brown powder results, decomposing at 250° C. with softening but no melting. The molecular weight is 2320 as determined by an osmotic method. This method (employed in all M.W. determinations herein set forth) is only an apparent molecular weight due to the fact that water is used as a solvent. The polyquaternary onium salts employed in practicing this invention are dissociated in water solutions, and the reported molecular weights are therefore appreciably lower than the true molecular weights.

Poly-2

This polyquaternary ammonium salt is a reaction product of hexamethylenetetramine and 1,5-dibromopentane.

Two hundred and fifty (250) ml. of xylene containing 13.8 g. (0.1 m.) of hexamethylenetetramine is heated to reflux. At this point 46 g. (0.2 m.) of 1,5-dibromopentane is added dropwise. At the end of the addition of the haloalkane, the reaction mass is converted to a gel. The gel is broken up, isolated by filtration, washed with benzene, and vacuum-dried at 60° C. The dried product is a yellow, brittle solid; M.P. 135° C. with a highly viscous melt; M.W. 1344 (osmotic method). Infrared analysis indicates that the product is a quarternary salt.

Poly-3

This polyquarternary ammonium salt is a reaction product of hexamethylenetetramine and ethylene bromide.

Four hundred (400) ml. of xylene containing 13.8 g. (0.1 m.) of hexamethylenetetramine is heated to reflux. At this point 37.6 g. (0.2 m.) of ethylene bromide is slowly added. A gelatinous mixture results. It is broken up so that stirring can be continued. The reaction mass is refluxed for an additional two hours, filtered, washed with benzene, and dried for about 16 hours at 100° C. under vacuum. A brittle, colorless, hygroscopic solid is obtained; M.P. 175° C.; M.W. 993 (osmotic method).

Poly-4

This polyquaternary ammonium salt is a reaction product of diethylamine and 1,5-dibromopentane.

A mixture of 200 ml. xylene, 7.3 g. (0.1 m.) diethylamine and 23.9 g. (0.1 m.) 1,5-dibromopentane is brought to reflux temperature and heated for two hours under reflux. The resulting tan product is isolated by filtration, washed with benzene and vacuum-dried at 100° C. for 18 hours. The dried material, which is a tan solid, decomposes at 250° C. without melting; M.P. 933 (osmotic method).

Poly-5

This polyquaternary ammonium salt is a reaction product of triethylenediamine and dimethyl sulfate.

To a solution of 22.4 g. (0.2 m.) of triethylenediamine in 200 ml. toluene is added dropwise 25.2 g. (0.2 m.) of dimethyl sulfate. The exothermic heat of reaction raises the temperature to 70° C. with the formation of a white precipitate. After the addition of the dimethyl sulfate has been completed, the reaction mass is heated under refluxing conditions for 3 hours. The product is separated by filtration, washed with benzene and vacuum-dried at 60° C. The dried material is a white, hygroscopic powder; M.P. 90° C.; M.W. 1180 (osmotic method).

Poly-6

This polyquaternary ammonium salt is a reaction product of hexamethylenetetramine and dimethyl sulfate.

To a solution of 27.6 g. (0.2 m.) of hexamethylenetetramine in 300 ml. of xylene is slowly added 50.4 g. (0.4 m.) of dimethyl sulfate. After completing the addition of the dimethyl sulfate, the reaction mass is heated for one hour under reflux. A white precipitate is formed. It is filtered off, washed with benzene and dried under vacuum at 60° C. The resulting white solid melts at 150° C., and has a molecular weight (osmotic method) of 1176.

Poly-7

This polyquaternary ammonium salt is a reaction product of triethylenediamine and m-benzenedisulfonic acid.

A solution of 23.8 g. (0.1 m.) of m-benzenedisulfonic acid, 11.4 g. (0.1 m.) triethylenediamine and 300 ml. toluene is heated under refluxing conditions for 3 hours. The product is isolated by filtration, washed with benzene and vacuum-dried at 60° C. The dried material is a tan powder, which does not melt at 300° C.; M.W. 2074 (osmotic method).

Poly-8

This polyquaternary ammonium salt is a reaction product of hexamethylenetetramine and m-benzenedisulfonic acid.

A solution of 7.0 g. (0.05 m.) hexamethylenetetramine, 23.8 g. (0.1 m.) m-benzenedisulfonic acid and 200 ml. xylene is heated to refluxing temperature. At this point a gummy, resinous mass results. Heating is discontinued, and the reaction mass is allowed to cool to room temperature. The gummy solid is separated by filtration, washed with benzene, and vacuum-dried at 100° C. The dried material is a brown solid which is infusible at 300° C.

Instead of the polyquaternary ammonium salt identified as Poly-4 in Table II, and which is exemplary of such salts consisting essentially of the recurring unit embraced by Formula V, one may use other salts wherein the recurring unit is within the scope of this formula. Additional examples of this class of salts are those obtained by reacting, for instance, diethylamine with ethylene bromide or with 1,4-dibromobutane. The preparation of these polyquaternary ammonium salts is described below:

Example 3

(A) To 250 ml. benzene are added 18.7 g. (0.1 m.) ethylene bromide and 7.3 (0.1 m.) diethylamine. The resulting solution is heated under refluxing conditions for 6 hours. The precipitate that forms is filtered off, washed with benzene and dried. The dried material is a white powder; yield, 6 g.; M.P. 212° C.

(B) Same as in the (A) portion of this example with the exception that 21.6 g. (0.1 m.) of 1,4-dibromobutane is substituted for 0.1 m. of ethylene bromide, and heating under reflux is continued for a total of 18 hours. The yield of polyquaternary ammonium salt in the form of a tan powder amounts to 15 g.

Also, instead of the polyquaternary ammonium salts identified as Poly-1, Poly-5 and Poly-7 in Table II, and which are exemplary of such salts consisting essentially of the recurring unit embraced by Formula VII, one may use other salts wherein the recurring unit is within the scope of this formula. Additional illustrations of such salts and their preparation are described in the following example.

Example 4

To 100 ml. of xylene are added 23.0 g. (0.1 m.) 1,5-dibromopentane and 11.2 g. (0.1 m.) triethylenediamine. The reaction mixture is heated to reflux. A gel-like material is formed as soon as refluxing begins. The gel is broken by stirring with a spatula, and refluxing is then continued for one hour after attaining the reflux temperature. The solid reaction product is isolated by filtration, washed with benzene and dried under heat and vacuum. A tan-colored, water-soluble, resinous product results; M.P. 115° C.; M.W. 2817 (osmotic method). Infrared analysis supports the structure of a quaternary salt.

In a preparation similar to that of Example 4 but using decahydronaphthalene ("Decalin") instead of xylene as a reaction medium, the product is obtained as a white powder.

In other preparations similar to those described under Example 4, and in the descriptions given with reference to the production of Poly-1, Poly-5 and Poly-7, other salts are made that are useful as electrolytes in practicing the present invention. A condensed description of such salts and their preparation is tabulated below. All preparations are made under refluxing conditions and using triethylenediamine as the polyfunctional tertiaryamine reactant.

arylenedisulfonic acid, or the like. The various trialkylenediamines, e.g., triethylenediamine and others hereinbefore mentioned by way of illustration, and hexamethylenetetramine are examples of the amine reactants.

From the foregoing it will be seen that the instant invention provides polymeric quaternary ammonium com-

| Anion-forming reactant | Liquid reaction medium | Appearance of product | M.W. (Osmotic method) |
|---|---|---|---|
| 1,4-dibromobutane | Xylene | Tan, resinous | 2,879 |
| Ethylene bromide plus 1,5-dibromopentane | do | White powder | |
| 1,4-dibromobutane plus 1,5-dibromopentane | do | do | |
| Diethyl sulfate | Toluene | White solid | 1,307 |

The following example illustrates the results obtained when an ethylenically unsaturated monomer different from that employed in Examples 1 and 2, more particularly acrylonitrile, is polymerized under electrolytic influences using a polymeric onium compound as an electrolyte and, for comparative purposes, a typical monomeric onium compound, specifically tetraethylammonium bromide, as an electrolyte.

Example 5

The same apparatus and general procedure are employed as described under Examples 1 and 2. The polymeric onium compound, Poly-6, used in this example is a polymeric quaternary ammonium salt obtained by reaction between hexamethylenetetramine and dimethyl sulfate. This salt and its preparation, which are believed to be broadly and specifically patentably new, have previously been described (see, for example, the description under the sub-heading "Poly-6"). The formulations, operating conditions and results are tabulated below:

| | A | B |
|---|---|---|
| Dimethylformamide, g | 260 | 260 |
| Tetraethylammonium bromide, mole | 0.1 | |
| Poly-6, mer mole | | 0.1 |
| Acrylonitrile, g | 140 | 140 |
| EMF, v | 20 | 20 |
| Current, milliamperes | 200→40 | ¹ 200 |
| Temperature, ° C | 35 | 35 |
| Time, hrs | 24 | 24 |
| Yield, g | 29 | 64 |
| Color of polyacrylonitrile | Brown | Yellow |

¹ Constant

As in the footnote to Table I the arrow between "200" and "40" in the column headed "T" means that the current changed throughout the reaction.

The results obtained further substantiate the observations noted when a comparison is made between the results of the polymerization runs described in Table I of Example 1, wherein typical monomeric quaternary ammonium electrolytes were used, and the runs of Table II of Example 2 wherein polymeric onium compounds of the kind used in practicing this invention were employed. More particularly, the results of the B run of this example show that the yield of polyacrylonitrile is more than doubled (over 120% more), its color is much better (yellow vs. brown), and the current is more stable when a polymeric onium electrolyte is used instead of a monomeric quaternary salt.

As has been indicated in the first paragraph of this specification certain of the electrolytes used in practicing the present invention are believed to be new per se well as their method of preparation. Such electrolytes include compositions comprising a polymeric quaternary ammonium wherein the quaternized atoms are in the polymer backbone, said compound being the polymeric reaction product, in approximately stoichiometrical proportions, of (1) an alkylene or aralkylene polyamine containing in its molecule at least two (e.g., two, three, four or more) tertiary-amino groups, said polyamine containing at least as many alkylene or aralkylene groups as tertiary-amino groups and (2) a polyfunctional quaternizing agent, e.g., a dihaloalkane, a dialkyl sulfate, an pounds which are the polymeric reaction products of approximately equal molar proportions of, for example, triethylenediamine and a dihaloalkane, a dialkyl sulfate or an arylenedisulfonic acid; as well as polymeric reaction products of, for instance, (1) hexamethylenetetramine and (2) a dihalolkane, a dialkyl sulfate or an arylenedisulfonic acid in a molar ratio of about 2 moles of the reactant of (2) per mole of the amine reactant of (1).

The present invention also provides a method of preparing the polymeric quaternary ammonium compounds described briefly in the two preceding paragraph and more fully in the earlier part of this specification and in certain of the examples. This method, broadly described, comprises bringing into reactive relationship approximately stoichiometrical proportions of (1) an amine containing in its molecule at least two tertiary-amino groups and (2) a polyfunctional quaternizing agent, numerous examples of both of which classes of reactants previously have been given.

Instead of the particular polymerizable monomers employed in certain of the examples relating to electroinitiated polymerizations of this invention, one may use any other ethylenically unsaturated monomer, numerous examples of which have been given in the portion of this specification prior to the examples. Likewise, instead of dimethylformamide other non-aqueous liquid media may be employed, or water, or an excess of the monomer to be polymerized. Numerous examples of such non-aqueous liquid media also have previously been given. It will further be understood by those skilled in the art that polymeric onium compounds other than those specifically set forth in the various examples may be prepared and used in practicing this invention, including the various polyternary sulfonium compounds and polyquaternary phosphonium compounds where in the ternarized sulfer atoms or quaternized phosphorus atoms in the said onium compounds are in the polymer backbone.

From the foregoing it will be evident that modifications of this invention can be made without departing from the spirit and scope of this disclosure or from the scope of the following claims.

We claim:

1. A method for the electrolytic polymerization of at least one polymerizable, ethylenically unsaturated monomer which comprises applying an electric potential to two electrodes immersed in a dispersion of said monomer in a liquid diluent containing a polymeric ternary or quaternary onium compound as a conducting electrolyte in an amount sufficient to make the said dispersion conducting, the ternarized or quaternized atoms in the said polymeric onium compound being in the polymer backbone, and said liquid diluent having a dielectric constant between 10 and about 110; and recovering the polymer of the said unsaturated monomer from the reaction mass.

2. The method as in claim 1 wherein the ethylenically unsaturated monomer contains at least one terminal $CH_2=C<$ grouping; the polymeric onium compound is a polymeric ternary sulfonium or quaternary ammonium or phosphonium compound; and the liquid diluent has a dielectric constant between about 25 and about 110.

3. The method as in claim 2 wherein the monomer undergoing electrolytic polymerization is a single ethylenically unsaturated monomer that contains at least one terminal $CH_2{=}{<}$ grouping, and the polymeric onium compound is a polyquaternary ammonium compound.

4. The method as in claim 3 wherein the polyquaternary ammonium compound consists essentially of the recurring unit represented by the general formula

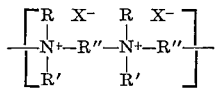

wherein R and R' each represent an alkyl, aralkyl, aryl or alkaryl radical, R'' represents an alkylene radical, and $X^-$ represents an anion.

5. The method as in claim 4 wherein the ethylenically unsaturated monomer is an alkyl alkacrylate.

6. The method as in claim 4 wherein the ethylenically unsaturated monomer is methyl methacrylate and the polyquaternary ammonium compound is a polyquaternary ammonium salt which is a reaction product of diethylamine and 1,5-dibromopentane.

7. The method as in claim 3 wherein the polymeric quarternary ammonium compound consists essentially of the recurring unit represented by the general formula.

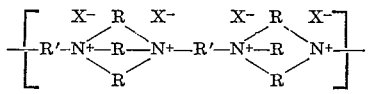

wherein R represents an alkylene or aralkylene radical, R' represents an alkylene radical, and $X^-$ represents an anion.

8. The method as in claim 7 wherein the ethylenically unsaturated monomer is a vinyl cyclic compound.

9. The method as in claim 8 wherein the vinyl cyclic compound is styrene.

10. The method as in claim 7 wherein the ethylenically unsaturated monomer is an acrylic compound.

11. The method as in claim 10 wherein the acrylic compound is methyl methacrylate.

12. The method as in claim 3 wherein the polyquaternary ammonium compound is a reaction product of a tetratertiary-amine and a difunctional quaternizing agent in the molar ratio of about 2 moles of the latter per mole of the former.

13. The method as in claim 12 wherein the tetratertiaryamine is hexamethylenetetramine and the difunctional quaternizing agent is a dihaloalkane.

14. A method for the electrolytic polymerization of polymerizable, ethylenically unsaturated monomer(s) which comprises applying an electric potential to two electrodes immersed in a dispersion of said monomer(s) in a non-aqueous liquid diluent containing a polymeric quaternary ammonium compound in an amount corresponding to from 0.01 mer mole to saturation, the quaternized atoms in the said polymeric quaternary ammonium compound being in the polymer backbone, said non-aqueous liquid diluent having a dielectric constant between 10 and about 110, and said monomer(s) constituting from about 5% to about 75% by weight of the total amount of the said diluent and the said monomer(s); and recovering the product of polymerization of the unsaturated monomer(s) from the reaction mass.

15. The method as in claim 14 wherein the non-aqueous liquid diluent has a dielectric constant between about 25 and about 110, and the electrolytic polymerization is effected at a temperature within the range of from about 0° C. to about 60° C.

16. The method as in claim 14 wherein the non-aqueous liquid diluent is selected from the group consisting of formamide, dimethylformamide, N,N-dimethylacetamide, dimethylsulfoxide, acetonitrile, nitrobenzene, pyridine, hexamethylphosphoramide, tetramethylenesulfone, N-methylpyrrolidone, and an excess of the monomeric material to be polymerized having a dielectric constant within the range of from 10 to about 110.

17. The method as in claim 16 wherein the non-aqueous liquid diluent is dimethylformamide.

References Cited

UNITED STATES PATENTS

| | | | |
|---|---|---|---|
| 2,261,002 | 10/1941 | Ritter | 260—567.6 |
| 2,271,378 | 1/1942 | Searle | 424—329 |
| 2,946,757 | 7/1960 | Butler | 260—567.6 |
| 3,140,276 | 7/1964 | Forster | 204—59 |

HOWARD S. WILLIAMS, Primary Examiner

U.S. Cl. X.R.

204—72; 260—567.6; 252—500